US008981901B1

(12) United States Patent
Halferty et al.

(10) Patent No.: US 8,981,901 B1
(45) Date of Patent: *Mar. 17, 2015

(54) METHOD AND SYSTEM FOR FINGERPRINT SCANNING AND REPORTING

(71) Applicant: Sprint Spectrum L.P., Overland Park, KS (US)

(72) Inventors: Clark D. Halferty, Lee's Summit, MO (US); Andrew M. Wurtenberger, Olathe, KS (US); Caleb S. Hyde, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/061,440

(22) Filed: Oct. 23, 2013

Related U.S. Application Data

(63) Continuation of application No. 12/949,492, filed on Nov. 18, 2010, now Pat. No. 8,604,906.

(51) Int. Cl.
*G05B 19/00* (2006.01)
*G06K 9/00* (2006.01)
*G05B 1/01* (2006.01)

(52) U.S. Cl.
CPC ............. *G06K 9/00013* (2013.01); *G05B 1/01* (2013.01)
USPC ........................ 340/5.83; 370/310; 379/88.22

(58) Field of Classification Search
CPC ....... G05B 19/00; G05B 1/01; G06K 9/00013
USPC ........................ 340/5.83; 379/88.22; 370/310
See application file for complete search history.

(56) References Cited

U.S. PATENT DOCUMENTS

| 6,720,712 | B2 | 4/2004 | Scott et al. | |
| 6,812,621 | B2 | 11/2004 | Scott | |
| 6,844,660 | B2 | 1/2005 | Scott | |
| 7,783,281 | B1 | 8/2010 | Cook et al. | |
| 2002/0081005 | A1* | 6/2002 | Black | 382/124 |
| 2003/0172044 | A1 | 9/2003 | ShamRao | |
| 2004/0172403 | A1* | 9/2004 | Steele et al. | 707/100 |
| 2005/0138394 | A1 | 6/2005 | Poinsenet et al. | |
| 2005/0169503 | A1 | 8/2005 | Howell et al. | |
| 2005/0226468 | A1 | 10/2005 | Deshpande et al. | |
| 2006/0104224 | A1* | 5/2006 | Singh et al. | 370/310 |
| 2006/0285663 | A1* | 12/2006 | Rathus et al. | 379/88.22 |
| 2008/0285813 | A1 | 11/2008 | Holm | |
| 2009/0176565 | A1* | 7/2009 | Kelly | 463/29 |

(Continued)

OTHER PUBLICATIONS

T. Harris, "How Fingerprint Scanners Work," HowStuffWorks, printed from the World Wide Web on Nov. 10, 2010.

(Continued)

*Primary Examiner* — Omer S Khan

(57) ABSTRACT

Disclosed is a method, system, and device for secret fingerprint scanning and reporting. When a portable communication device has been lost or stolen, an entity may transmit a fingerprint scan-report trigger message to the device. In response to receipt of the fingerprint scan-report trigger message, the device then automatically invokes an integrated fingerprint scanner to scan a fingerprint of a user of the device and to report the resulting fingerprint data to a remote destination. Optimally, the scanning and reporting are done without notification to a user of the device. The method, system, and device may thereby help to identify the user of the device and to potentially recover the device.

16 Claims, 8 Drawing Sheets

(56) References Cited

U.S. PATENT DOCUMENTS

| | | | |
|---|---|---|---|
| 2010/0106832 A1* | 4/2010 | Tysklind et al. | 709/226 |
| 2010/0225607 A1 | 9/2010 | Kim | |
| 2012/0069042 A1 | 3/2012 | Ogita et al. | |

OTHER PUBLICATIONS

AuthenTec, "Consumer Markets," Finger U—Markets—AuthenTec—Biometric Fingerprint Sensor, printed from the World Wide Web on Jan. 27, 2006.

I. Georgescu, "Sharp Develops Fingerprint-Reading VGA Touchscreen," Softpedia, Feb. 26, 2007, printed from the World Wide Web.

Authentify, "New Voice Biometric Solution in Authentify 4.0 Enables Firms to Offer Broader Spectrum of Online Services," http://www.authentify.com/news/releases/02071540release.html, printed from the World Wide Web on May 11, 2005.

M. Prokop and S. Machlis, "Security highlights from around the web," Computerworld, May 6, 2005, printed from the World Wide Web.

R. Lehrbaum, "Device Profile: CDL Paron 'secure PDSA'," Nov. 6, 2002, http://www.linuxdevices.com/articles/AT7145548309.html, printed from the World Wide Web.

Terminal, Software Technologies, "Portable Fingerprint Identification Device (FingerToken)," NTT Microsystem Integration Laboratories, Dec. 2003.

Minding the Planet: Wireless Technology, http://novaspivack.typepad.com/nova_spivacks_weblog/wireless_techno . . . , printed from the World Wide Web on Nov. 16, 2005.

P. Wasserman, "Solid-State Fingerprint Scanners," Dec. 26, 2005.

\* cited by examiner

88 — PROVIDE A WIRELESS COMMUNICATION DEVICE (WCD) THAT HAS (i) A WIRELESS TRANSCEIVER FOR ENGAGING IN AIR INTERFACE COMMUNICATION WITH A SERVING RADIO ACCESS NETWORK, (ii) A FINGERPRINT SCANNER, (iii) A PROCESSOR, AND (iv) DATA STORAGE CONTAINING PROGRAM LOGIC, IN WHICH THE FINGERPRINT SCANNER IS OPERABLE TO SCAN A FINGERPRINT OF A USER OF THE WCD, AND THE PROGRAM LOGIC DEFINES A FINGERPRINT SCAN-REPORT FUNCTION THAT IS EXECUTABLE BY THE PROCESSOR, AUTOMATICALLY IN RESPONSE TO A FINGERPRINT-SCAN TRIGGER MESSAGE RECEIVED BY THE WCD VIA AN AIR INTERFACE FROM THE RADIO ACCESS NETWORK (a) TO CAUSE THE FINGERPRINT SCANNER TO SCAN THE FINGERPRINT OF THE USER WITHOUT PROVIDING TO THE USER A NOTIFICATION OF THE FINGERPRINT SCANNING AND (b) TO TRANSMIT RESULTING FINGERPRINT DATA VIA THE RADIO ACCESS NETWORK TO A NETWORK SERVER WITHOUT PROVIDING TO THE USER A NOTIFICATION OF THE TRANSMITTING 90 — TRANSMIT THE FINGERPRINT-SCAN TRIGGER MESSAGE TO THE WCD FROM THE RADIO ACCESS NETWORK SO AS TO CAUSE THE WCD TO EXECUTE THE FINGERPRINT SCAN-REPORT FUNCTION AND SO AS TO CAUSE THE WCD TO REPORT THE RESULTING FINGERPRINT DATA TO THE NETWORK SERVER

FIG. 9

METHOD AND SYSTEM FOR FINGERPRINT SCANNING AND REPORTING

REFERENCE TO RELATED APPLICATION

This is a continuation of U.S. patent application Ser. No. 12/949,492, filed Nov. 18, 2010, the entirety of which is hereby incorporated by reference.

BACKGROUND

Portable communication devices have advanced dramatically in form and function in recent years. Cell phones that once provided mere telephone service, for instance, now typically incorporate advanced computing, networking, and user interface functions, offering a myriad of multi-media services and data management functions. Furthermore, the widespread availability of wireless communication service has allowed commercialization of numerous new types of devices and new versions of existing devices, such as wirelessly-equipped navigation units, wirelessly-equipped electronic book readers, wirelessly-equipped personal data assistants, wirelessly-equipped notebook and tablet computers, wirelessly-equipped cameras and camcorders, and wirelessly-equipped package tracking devices, among others.

With these advances, however, portable communication devices have become not only more valuable to their owners, but also more valuable to prospective thieves. For instance, a thief could attempt to steal such a device in order to benefit from personal data stored on the device, or simply to benefit from use or resale of the device itself.

When a portable communication device is lost or stolen, the owner of the device may be able to contact a service provider to report the theft and to cancel wireless communication service for the device, if applicable. However, mere cancellation of such service does not help to facilitate recovery of the device itself. An improvement is therefore desired.

OVERVIEW

Disclosed herein is a method and system for secret fingerprint scanning and reporting on a portable communication device, in an effort to assist law enforcement or other personnel in attempting to recover the device, or for other purposes.

In exemplary implementation, when a device is reported lost or stolen, a trigger message will be transmitted to the device, to cause the device to secretly invoke a fingerprint scanning/reporting function so as scan a fingerprint of a user of the device and to report the scanned fingerprint data to a network server or other entity (e.g., a law enforcement server). Optimally, this process will be performed secretly, in that when the process is being performed the device will not provide a user of the device (e.g., the thief) with a notification that the process is being performed.

In practice, the device may include an integrated fingerprint scanner and logic arranged to carry out the secret fingerprint scanning and reporting function in response to receipt of the trigger message. Further, some or all of the logic that causes the device to invoke its fingerprint scanner and to report the resulting fingerprint data could be stored on the device in advance of the device receiving the trigger message that causes execution of the logic, and/or some or all of that logic could be provided to the device as part of the trigger message itself.

The fingerprint scanner of the device can be integrated in an outwardly visible manner such that a user of the device can intentionally touch a fingertip to the scanner so as to facilitate fingerprint scanning. Such a visibly positioned fingerprint scanner could be used for other purposes as well, such as to authenticate a user for purposes of allowing secure access to device functions or contents. In accordance with the present method, such a scanner could be secretly invoked, however, so that when a user happens to touch a fingertip to the scanner, the scanner could scan the user's fingerprint even during normal use of the device, i.e., without the user necessarily having intentionally touched a fingertip to be scanned.

Alternatively, the fingerprint scanner could be provided in a hidden manner in the device, such as by integrating the scanner beneath an outer surface of the device housing or beneath an outer surface of a button on the device, while providing optical, electrical, or other connectivity between the scanner and a device surface or layer on which a user may place a fingertip. With the scanner hidden in that manner, the scanner could function to scan a user's fingerprint when the user touches a fingertip to the housing or layer over where the scanner is located, perhaps without the user knowing that fingerprint scanning is occurring. Integrating a fingerprint scanner with a button can also provide separate utility as a way to authenticate the device user or to otherwise control access to one or more functions concurrently with invoking a function when the user presses the button.

Once the device scans a user's fingerprint, the device will optimally transmit the resulting fingerprint data to a designated destination, such as a predefined network address or an address that was designated by the trigger message. Law enforcement or other personnel (e.g., automated systems or people) may then receive and use the fingerprint data as a basis to try to identify the person whose fingerprint was scanned and, in turn, as a basis to potentially recover the device.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9 is another flow chart depicting example functions that can be carried out in accordance with an embodiment of the method.

DETAILED DESCRIPTION

Figure 1:
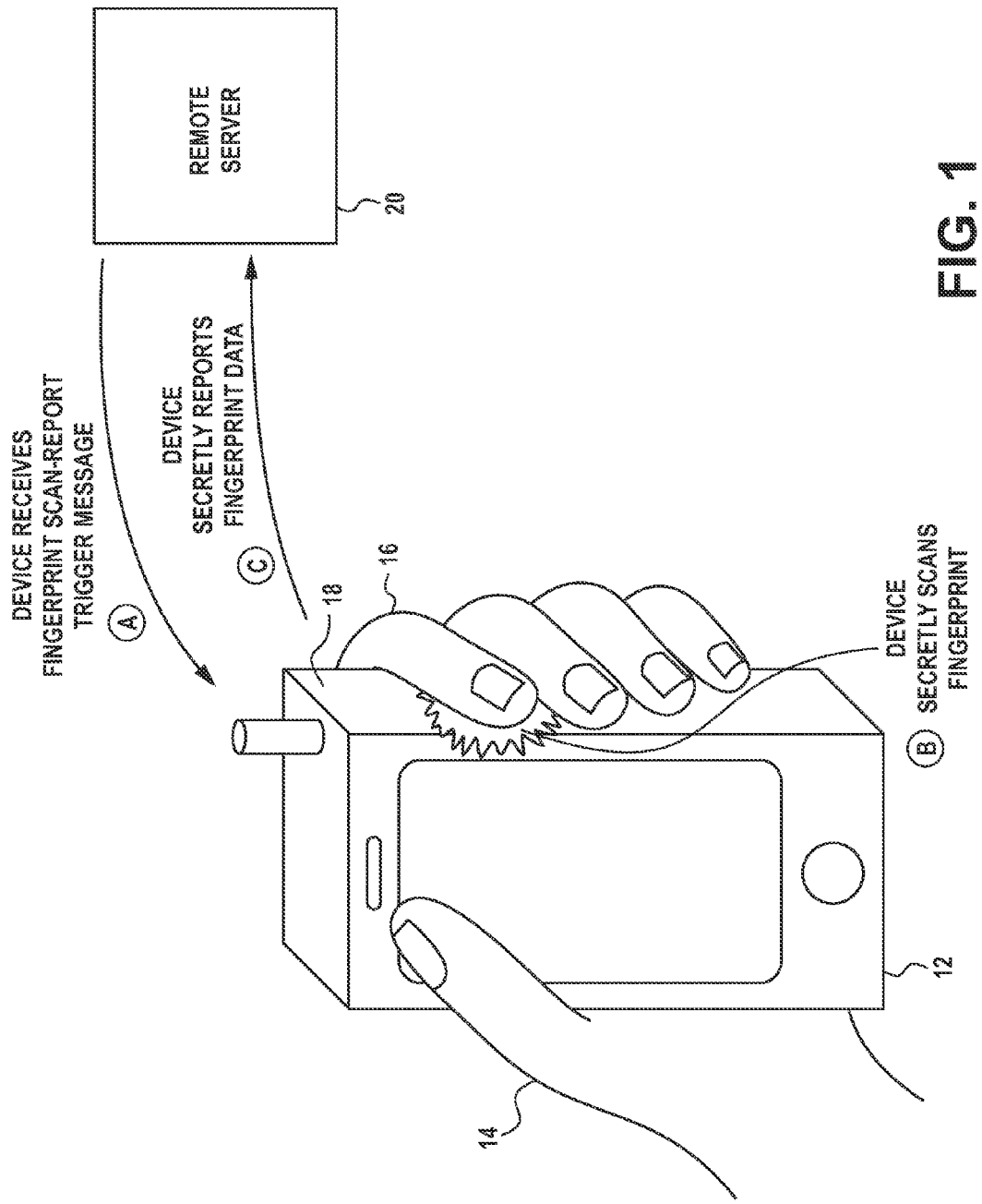
FIG. 1 is an illustration depicting how an embodiment of the present method may operated in practice.

As noted above, FIG. 1 is an illustration depicting how an embodiment of the present method may operate in practice. In particular, FIG. 1 shows a portable communication device (PCD) 12 being held in a user's hand 14, such that the user's pointer finger 16 is applied against a side surface 18 of the device. In this example arrangement, we can assume that a fingerprint scanner (not shown) is integrated into the side surface of the device, either in an outwardly visible manner or hidden under the surface with suitable optical, electrical, or other connectivity so that the fingerprint scanner can scan the user's fingerprint when a fingertip is applied to the surface where the scanner is located. FIG. 1 then also shows a remote server 20, which may be a server operated by law enforcement or by another entity by way of example.

In the illustration of FIG. 1, PCD 12 is shown as a handheld wireless communication device such as a touch screen cellular phone with modern "candy bar" configuration for instance. While that is a viable example, it should be understood that the PCD could take any of a variety of forms. As examples, the PCD could be any form or any of the types of devices listed in the background section above, or the PCD could be largely any type of communication device that can be moved from place to place, whether handheld or not, and whether equipped for wireless communication or wired communication. As such, the device may have a different physical configuration from that shown, and a user may touch the device in ways different from that shown.

FIG. 1 illustrates three representative steps involved in the example implementation. As shown, at step A, the PCD 12 first receives a fingerprint scan-report trigger message that is transmitted from the remote server 20. In practice, the server could generate and transmit this message to the PCD in response to a report that PCD has been lost or stolen or in some other situation. The fingerprint scan-report trigger message generally functions to cause the PCD to carry out the next two illustrated steps.

At step B, in response to receipt of the fingerprint scan-report trigger message, PCD 12 will automatically invoke its fingerprint scanner so as to scan a fingerprint of the user of the device. In practice, this means that the PCD 12 will put the fingerprint scanner or associated logic in a state in which the scanner can and will scan a fingerprint when a finger is positioned on or over the scanner.

In the illustration of FIG. 1, for instance, this scanning may occur when the user's pointer finger 16 is applied on the side surface of the device where the fingerprint scanner is located. More particularly, in this state, the fingerprint scanner can constantly scan, and the scanning can be considered complete once a legitimate image of a fingerprint has been received. Alternatively or additionally, a proximity scanner can be implemented by the device in or around the location of the fingerprint scanner and can be invoked in response to the fingerprint scan-report trigger message, so as to then detect when a finger is present near the scanner, and the device may have the scanner scan an image of the user's fingerprint in response to the proximity sensor detecting the presence of the finger in that area. Other arrangements are possible as well. In any event, the fingerprint scanner may then produce a signal or data representative of the fingerprint of the user, and data (e.g., an image) representing the fingerprint can then be stored in the device.

At step C, also in response to receipt of the fingerprint scan-report trigger message, PCD 12 will automatically transmit the resulting fingerprint data to a remote destination, such as to the same remote server 20 that sent the fingerprint scan-report trigger message. To the extent the PCD does not have adequate network connectivity through which to transmit the fingerprint data, the PCD may hold the fingerprint data until the device acquires such connectivity, and the device may operate to acquire such connectivity in order to then transmit the fingerprint data.

In preferred implementation, the PCD will carry out at least steps B and C without providing to the user of PCD any notification that the steps are being carried out. Thus, the act of the PCD scanning the user's fingerprint would be performed secretly from the perspective of the user, and the act of the PCD reporting the user's fingerprint to the remote destination would be performed secretly from the perspective of the user as well.

The secret scanning and reporting can advantageously function to allow the fingerprint of the user to be obtained remotely without the knowledge of the device user. It is believed that this secret operation can possibly help to recover a stolen device by avoiding disclosing to the user of the device (possibly a thief) that the user's fingerprint is being captured and reported. If the remote server or other entity (device or person) can correlate the resulting fingerprint data with the person whose fingerprint was scanned, finding that person may then help find the device.

To further assist in recovering the PCD, the PCD may additionally be arranged to automatically report to the remote destination, together with the fingerprint data, a current location of the PCD. The PCD may determine its the current location by use of global positioning system (GPS) techniques now know or later developed, perhaps with the assistance of one or more other network entities, or in some other manner.

Although FIG. 1 depicts the fingerprint scanner as being provided on a side surface of the device, it should be understood that the fingerprint scanner could be provided elsewhere on the device, and indeed multiple fingerprint scanners could be provided and could all be invoked at the same time or at various times when carrying out the present method. FIGS. 2-4 depict some options of where a fingerprint scanner could be located on the device, with respect to an outer housing of the device for instance.

Figure 2A:
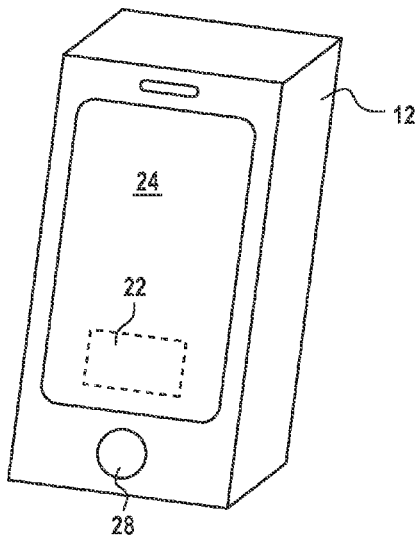
FIG. 2, including parts 2A and 2B, is an illustration of an example arrangement of a portable communication device having a fingerprint scanner arranged for use in an embodiment of the method.
Figure 2B:
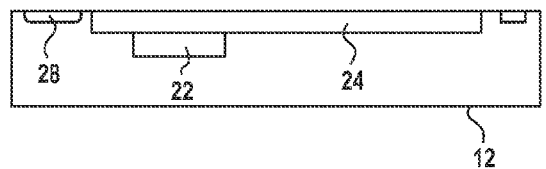

FIG. 2 illustrates one example arrangement in which a fingerprint scanner 22 is positioned behind or otherwise integrated with a touch screen display 24 of the device. As shown by the dashed lines in the perspective view of FIG. 2A, for instance, the fingerprint scanner may be positioned behind the touch screen at a particular location. Optimally, the location where the fingerprint scanner would be positioned would be a location where a user of the device is likely to touch a fingertip to the touch screen. By way of example, some touch screen devices provide a touch-screen based slide-to-unlock function where the device displays a slider graphic and a user physically slides a fingertip from one point to another in order to unlock the device. In such a device, one useful location for the fingerprint scanner is behind the area of the screen where the user would touch to begin the sliding motion, or perhaps extending along the path that the user would slide the fingertip. Other examples are possible as well. FIG. 2B is a side cross-sectional view of the example device, showing that the fingerprint scanner 22 in this arrangement is positioned below the touch screen display surface 24. Additional information about positioning a fingerprint scanner behind a touch screen display is provided by U.S. Patent Application Pub. No. 2010/0225607, the entirety of which is hereby incorporated by reference.

FIG. 3 next illustrates an example arrangement in which a fingerprint scanner 26 is positioned behind or otherwise integrated with a button 28 of the device. The button can be a mechanical push-button switch, a slider switch, or another type of button or switch on the device, preferably separate and apart from a display screen of the device (and thus not integrated with the display screen). As a specific example, the button may be a "home" button that a user can engage in order to return the device to a home state in which the device displays a default user interface or the like. As another example, the button may be a navigation button that a user can engage and perhaps toggle or otherwise move in order to navigate through a user interface of the device. And as still another example, the button may be a power button that a user can engage in order to power-on or power-off the device. Other examples are possible as well, such as a volume control button, a push-to-talk button, a shutter-release button, a setup button, one or more keys on a keyboard or keypad, or other type of button now known or later developed, in any of a variety of positions on the device.

Figure 3A:
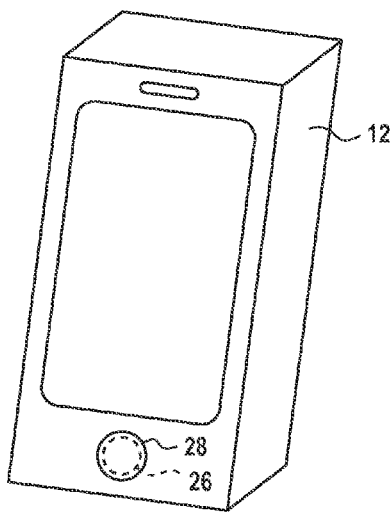
FIG. 3, including parts 3A and 3B, is an illustration of another example arrangement of a portable communication device having a fingerprint scanner arranged for use in an embodiment of the method.
Figure 3B:
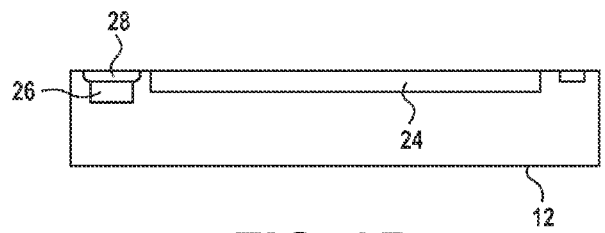

FIG. 3A shows that the fingerprint scanner 26 can be strategically positioned behind the button 28, and FIG. 3B is a side cross-sectional view of the device showing the fingerprint scanner 26 positioned below the button. Optimally, as noted above, the scanner in this position would have optical, electrical, or other connectivity with an outer surface of the button onto which the user would place a fingertip. For instance, the button could be made of a glass or plexiglass material that allows optical communication through the button from the outer surface to the scanner, or the button could be made of a conductive material that allows electrical connection through the button from the outer surface to the scanner. Alternatively, the button could itself be the fingerprint scanner or part of the fingerprint scanner, such that application of a fingertip to the button would constitute application of a fingertip to the fingerprint scanner itself. Other arrangements are possible as well.

Figure 4A:
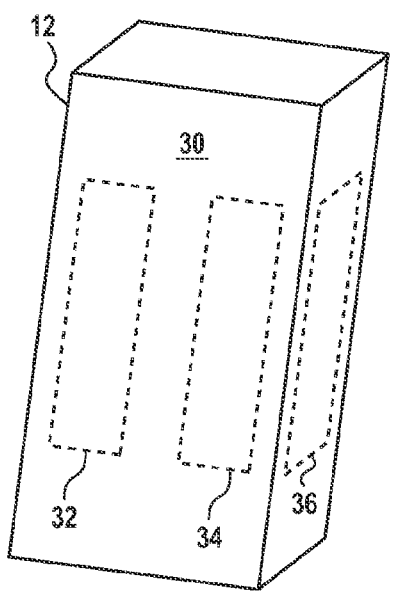
FIG. 4, including parts 4A and 4B, is an illustration of another example arrangement of a portable communication device having a fingerprint scanner arranged for use in an embodiment of the method.
Figure 4B:
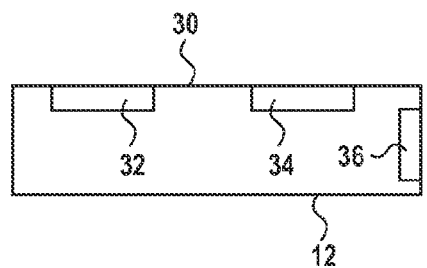

FIG. 4 next depicts an example arrangement in which numerous fingerprint scanners are positioned behind or otherwise integrated with the back surface 30 or side surface 18 of the device. In particular, as shown by FIG. 4A, two fingerprint scanners 32, 34 are positioned behind the back surface of the device, one along and near the left side of the back surface and the other along and near the right side of the back surface. With this arrangement or with other arrangements of fingerprint scanners on or behind the back surface of the device, when a user holds the device with the front surface of the device facing the user and with one or more of the user's fingertips on the back surface of the devices for support, either or both fingerprint scanner could then conveniently be made to scan the user's fingerprint. Further, as also shown in FIG. 4A, a fingerprint scanner 36 can be positioned behind or otherwise integrated with a side surface 18 of the device, to allow scanning in an arrangement where the user's fingertip touches the side surface 18, such as that shown in FIG. 1. FIG. 4B then illustrates an end cross-sectional view of the device, showing fingerprint scanners 32, 34 behind the back surface and fingerprint scanner 36 behind the side surface 18.

Figure 5:
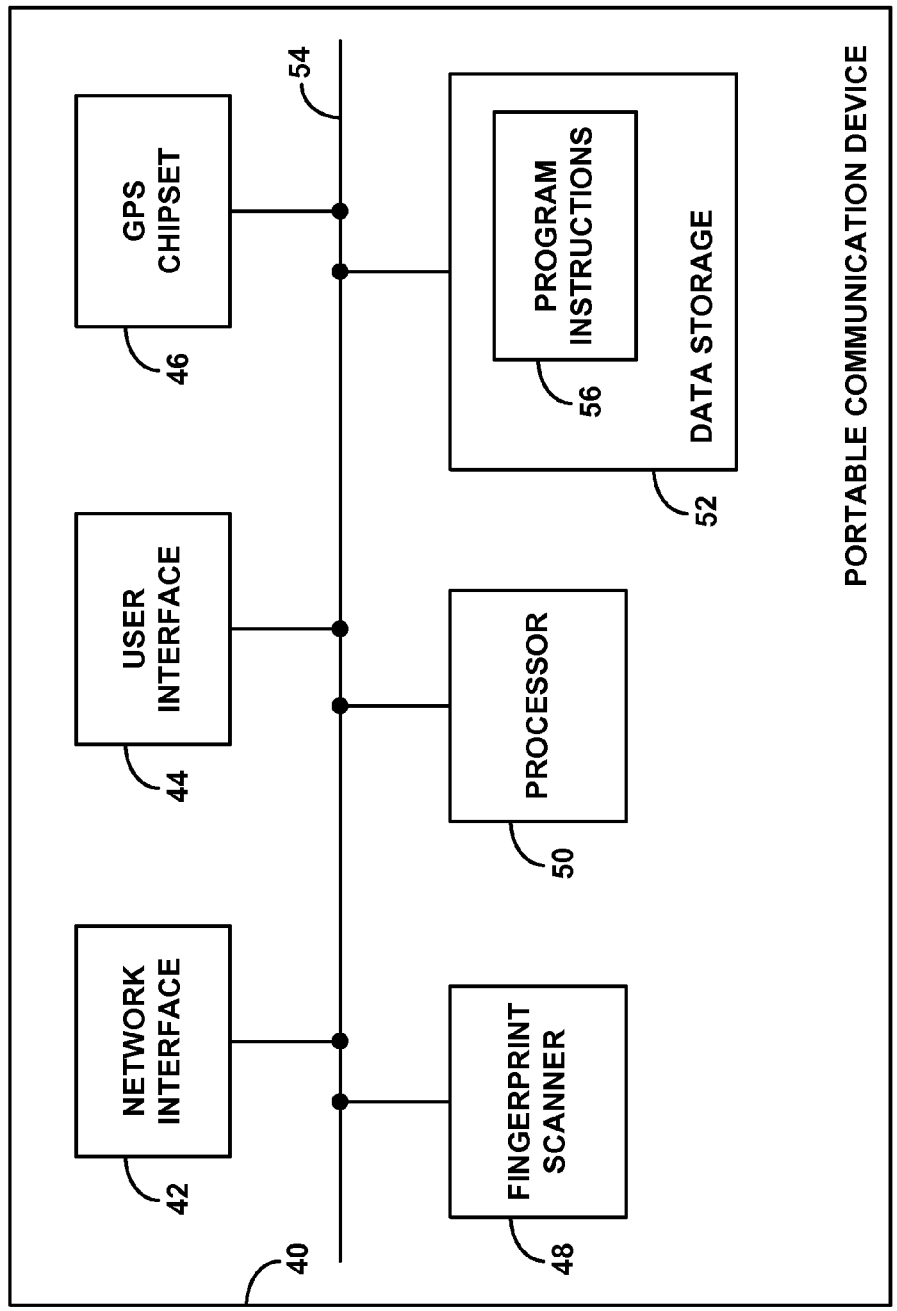
FIG. 5 is a simplified block diagram of a portable communication device arranged to implement the present method, showing some of the components that can be included such a device.

FIG. 5 is next a simplified block diagram depicting components that can be included in an example PCD 12 in accordance with the present method. As shown, the example PCD includes, preferably within or integrated with an outer device housing 40, a network interface 42, a user interface 44, a GPS chipset 46, a fingerprint scanner 48, a processor 50, and data storage 52, all of which can be suitably interconnected with each other through a system bus or other connection mechanism 54 (shown in a simplified manner by a line in the figure).

Network interface 42 functions generally to enable device 12 to communicate through a network with remote entities, so as to receive from a remote server a fingerprint scan-report trigger message that will trigger secret fingerprint scanning by the device, and to send to a remote destination (perhaps the same remote server) resulting fingerprint data. As such, network interface 42 can take any of a variety of forms, to facilitate any of a variety of types of network communication, such as landline, wireless, packet-switched, and/or circuit-switched communication for instance. As one example, network interface 42 may comprise a wireless chipset and associated antenna, for communicating with a radio access network such as a cellular network for instance. As another example, network interface 42 may comprise an Ethernet interface for coupling with an Ethernet cable that provides connectivity with a network. Other examples are possible as well.

User interface 44 functions generally to facilitate interaction with a user of the device. As such, the user interface may include input components such as a keyboard or keypad, a touch-sensitive screen, a navigation control, a microphone, and a camera, and the user interface may include output components such as a display screen, a loudspeaker, and a vibrating motor for providing tactile output, for instance.

GPS chipset 46 functions to receive signals from global positioning system satellites, so as to facilitate determination of the location of the device in any manner now known or later developed. Although GPS chipset 46 is shown as a separate component, its functions could be integrated with other components of the device, such as with network interface 42 for instance.

Fingerprint scanner 48 functions to scan one or more fingerprints of a user of the device. As discussed above, the fingerprint scanner can be provided visibly or in a hidden manner in or on the device. The fingerprint scanner can take any of a variety of forms. By way of example, the scanner can be a capacitive scanner, an RF scanner, a thermal scanner, a piezoresistive scanner, an ultrasonic scanner, a piezoelectric scanner, a MEMS scanner, an optical rolling tube scanner, a direct optical scanner, and/or a silicon CCD scanner. Further, the scanner can be arranged as a sweep scanner such that a user would sweep a finger across an array of sensors, or as an area sensor such that a user could apply a fingertip in one place and an array of sensors can obtain a full scan of the fingerprint. As further noted above, the fingerprint scanner can be integrated with the housing of the device and/or with one or more buttons or other user interface components of the device, such as by using the housing or user interface component as a portion of the scanner, allowing scanning through the housing or user interface component, or in some other manner. Optimally, the fingerprint scanner would be provided in the device in a position where a user of the device is likely to place a fingertip during normal use of the device, whether intentionally for purposes of authentication or unlocking or the like, or unintentionally merely for purposes of holding or otherwise supporting the device or otherwise interacting with the device.

In practice, the fingerprint scanner may produce a signal that represents a scanned fingerprint. The signal may itself define data such as an image of the fingerprint or may take another form that the device can convert to a fingerprint image or can otherwise convert to fingerprint data. The resulting fingerprint data can then be provided via connection 54 to processor 50 and/or data storage 52.

Processor 50 may comprise one or more general purposes processors (e.g., INTEL microprocessors) and/or one or more special purpose processors (e.g., digital signal processors or application specific integrated circuits) and may be integrated in whole or in part with network interface 42 or with other components of the device. Data storage 52, in turn, may comprise one or more volatile and/or non-volatile storage components, such as optical, magnetic, flash, or organic storage modules now known or later developed, and may be integrated in whole or in part with processor 50 or with other components.

Data storage 52 may contain program instructions 56 that are executable or interpretable by processor 50 to carry out various functions of the present method. In alternative embodiments, the device can carry out some or all of these functions by implementing any combination of hardware, firmware, and/or software, or in any other manner that may be devised. Further, from time to time, data storage 52 may contain data related to fingerprint scan-report trigger messages as well as fingerprint data resulting from application of fingerprint scanner 48.

By way of example, program instructions 56 may define logic (e.g., an executable script) that can be executed by the processor to receive via the network interface 42 a fingerprint scan-report trigger message and, in response to receipt of that message, (i) to invoke fingerprint scanner 48 so as to scan a fingerprint of a user of the device without providing the user with notification of the scanning, and (ii) to transmit the resulting fingerprint data via network interface 42 to a particular remote destination, without providing the user with notification of the transmitting. As noted above, the remote destination may be the same entity from which the device received the fingerprint scan-report trigger message, such as a law enforcement server for instance, or may be another entity.

In one embodiment of the method, the device may be programmed with logic to implement the secret scanning and reporting functions, and the device may further be programmed with logic to receive the fingerprint scan-report trigger message and to treat the received fingerprint-scan report trigger message as a trigger to cause the device to carry out the secret scanning and reporting logic.

Further, the trigger message itself may specify an address of the remote destination, and the device may programmatically read that address and then send the resulting fingerprint data to that address. The message may specify the address as a source address of the message, so that a reply providing the fingerprint data can be sent to that address. Alternatively, the message may specify a particular remote destination address in some other manner, particularly if the address is different than the source address of the message.

In another embodiment, the fingerprint scan-report trigger message may itself carry and thus provide the device with logic (e.g., program code defining an executable script) to carry out the secret scanning and reporting function. In practice, the device may thus receive the trigger message, read and extract the logic from the message, and then execute the logic.

To the extent the fingerprint scan-report trigger message provides data (e.g., an executable script) to be received and used or referenced by the device, the message itself may carry that data, or the message may function as a trigger that causes the device to responsively obtain the data from a designated location. By way of example, the fingerprint scan-report trigger message could be a short messaging service (SMS) message that itself provides data, or the fingerprint scan-report trigger message could be a multimedia messaging service (MMS) message or wireless application protocol (WAP) push message that directs the device to download data from a particular network address.

Figure 6:
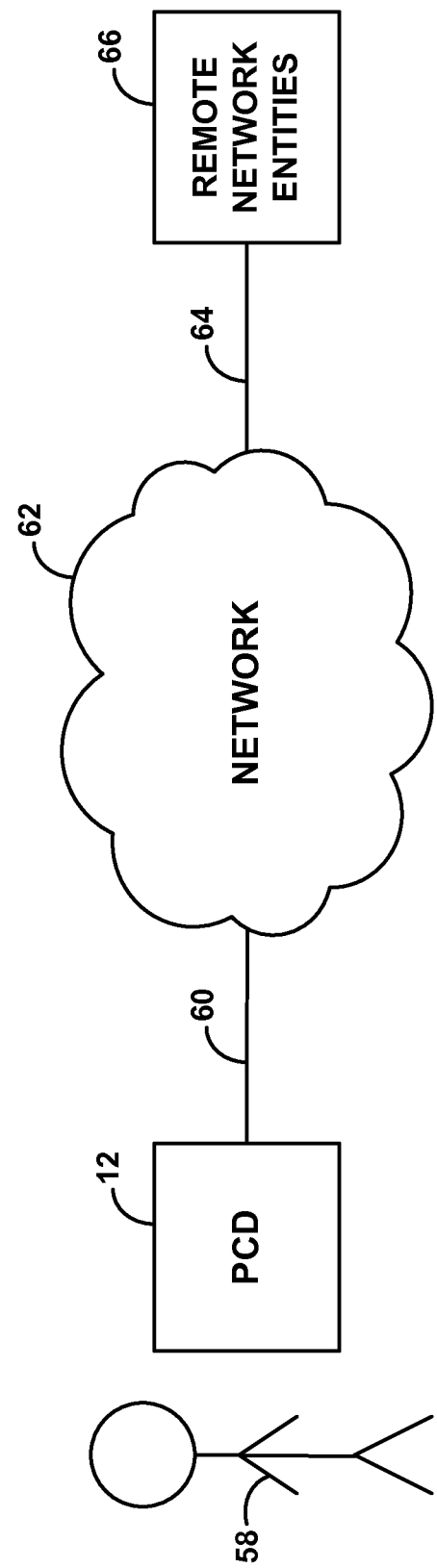
FIG. 6 is a simplified block diagram of a system in which embodiments of the method can be implemented.

FIG. 6 is next a simplified block diagram of a system in which embodiments of the method can be implemented. FIG. 6 generally depicts PCD 12 being operated by a user 58 and having a communication link 60 with a network 62, which in turn provides a communication link 64 with one or more remote servers and/or other entities 66. Communication link 60 can take various forms, such as wired, wireless, packet-switched, and/or circuit switched, and can itself include numerous segments, components, and/or paths. Likewise, communication link 64 can take various forms, such as wired, wireless, packet-switched, and/or circuit switched, and can itself include numerous segments and components. In practice, PCD 12 will be arranged in a manner that facilitates communication via link 60, and remote entities 66 will be arranged in a manner that facilitates communication via link 64.

Although not shown, each remote entity 66 may itself be arranged with a network interface for communicating over link 64, and with a processor, data storage, and other components. In practice, an example remote entity 66 may be programmed with logic to send a fingerprint scan-report trigger message to a particular PCD 12, such as a message destined to an address of the PCD. By way of example, if the PCD is a cellular wireless device having a mobile directory number, mobile identification number, international mobile subscriber identifier, or other identifier that can be used as a basis to send a message the PCD, the remote entity may use the identifier as a basis to send a fingerprint scan-report trigger message to the PCD. The entity may programmatically generate and send the trigger message in response to a user directive or in response to one or more other trigger events. Further, an example remote entity may be arranged to receive fingerprint data reported from the PCD and to automatically evaluate the data and/or to provide the data to another system or to a user, for use in attempting to identify the user 58 of the PCD and, potentially, in helping to recover the PCD.

Figure 7:
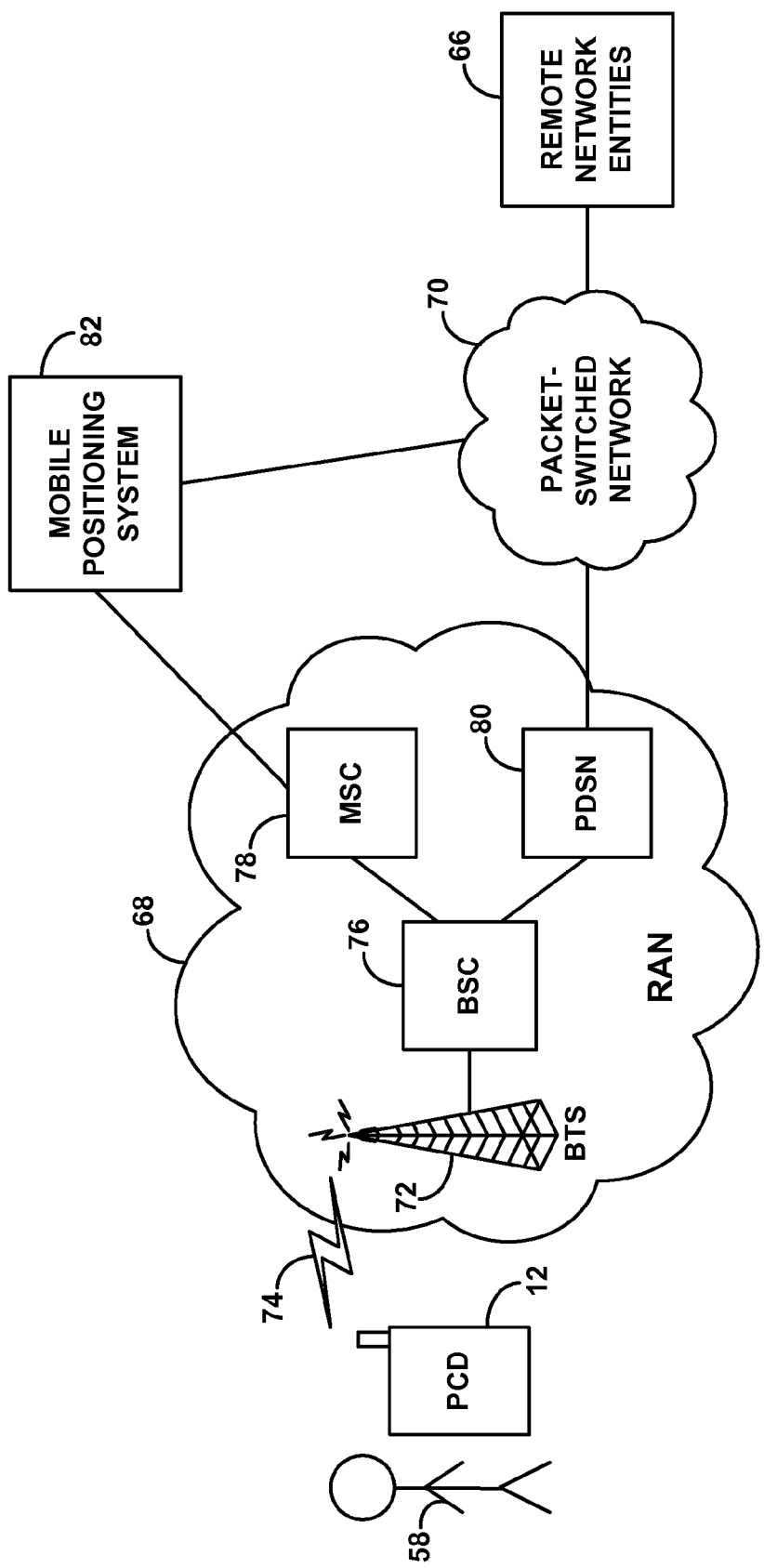
FIG. 7 is a simplified block diagram of a system in which embodiments of the method can be implemented.

FIG. 7 is another simplified diagram of a specific system arrangement in which the method can be implemented. In particular, FIG. 7 depicts the PCD 12 as a cellular wireless communication device being served by a cellular radio access network (RAN) 68 that provides connectivity in turn with a packet-switched network 70 on which one or more of the remote entities 66 may sit. RAN 68 may take any of a variety of forms, only one example of which is shown. In the arrangement shown, the RAN 68 includes a base transceiver station (BTS) 72 that radiates to define an air interface 74 through which the RAN can communicate with the PCD. BTS 72 is then coupled with a base station controller (BSC) or 76, which is in turn coupled with a mobile switching center (MSC) 78 and a packet data serving node (PDSN) 80. The MSC 78 is then shown in communication with a mobile positioning system (MPS) 82, and the PDSN 80 is shown in communication with packet-switched network 70, which also couples with MPS 82.

In this arrangement, PCD 12 may be arranged in a manner now known or later developed to communicate via RAN 68 with remote entities 66 and further to interact with MPS 82. In practice, for instance, PCD 12 may be arranged to receive SMS or MMS messages via RAN, where such a message may carry a fingerprint scan-report trigger message in accordance with the present method. Further, PCD 12 may be arranged to communicate via a radio link, data link, and network link, through RAN 68, to report resulting fingerprint data to a remote destination.

MPS 82 may help facilitate location determination to locate a cellular wireless device such as PCD 12, particularly if the GPS radio 46 in the device is not disabled by a user and if the device has a clear enough view of the sky or is otherwise able to receive GPS satellite signals. In practice, for instance, the MPS 82 may provide the PCD 12 with satellite-assistance data selected based on a general location (e.g., serving base station location) of the PCD, and PCD 12 may then use that data to tune to satellites in the sky over the PCD so as to somewhat quickly obtain signals that either PCD 12 or MPS 82 can then use to determine the location of the PCD with a high level of accuracy.

In the arrangement of FIG. 7, a remote entity may thus send a fingerprint scan-report trigger message to the PCD, which would pass to the PCD via RAN 68 and air interface 74. Pursuant to logic in the message or logic invoked by the message, the PCD may then responsively scan a fingerprint of user 58 and report the resulting fingerprint data via air interface 74, RAN 68, and network 70 to a remote destination. Further, the PCD may determine its own geographic location (e.g., work with MPS 82 to determine its location as described above, or determine its location independent of MPS 82) and may include latitude/longitude data together with its report of the fingerprint data.

Figure 8:
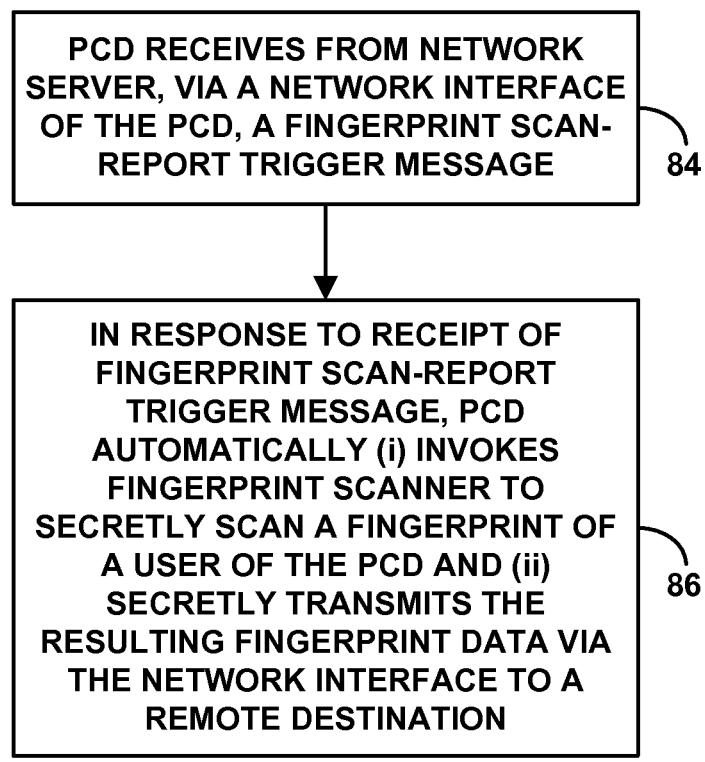
FIG. 8 is a flow chart depicting example functions that can be carried out in accordance with an embodiment of the method.

FIG. 8 is next a flow chart depicting an example set of functions that can be carried out in accordance with an embodiment of the present method. As shown, at step 84, the method involves the PCD receiving from a network server, via a network interface of the PCD, a fingerprint scan-report trigger message. At step 86, the method then involves the PCD automatically (e.g., programmatically) responding to receipt of the fingerprint scan-report message by carrying out functions including (i) invoking fingerprint scanner 48 to scan a fingerprint of a user of the PCD in a manner that does not provide to the user a notification of the fingerprint scanning (e.g., without providing any audible, visible, or vibrating indication of the scanning) and (ii) transmitting resulting fingerprint data via the network interface to a remote destination in a manner that does not provide to the user a notification of the transmitting (e.g., without providing any audible, visible, or vibrating indication of the scanning).

In practice, as noted above, the act of invoking the fingerprint scanner to scan the fingerprint of the user may involve transitioning the scanner into an active state in which the scanner waits for a fingertip to be applied to the scanner and then scans the fingerprint. Further, as noted above, a proximity sensor (not shown) or other mechanism could be integrated in the device to trigger the scanning. Further, the act of transmitting the resulting fingerprint data to the remote destination could involve waiting for the PCD to acquire network connectivity (e.g., to acquire wireless packet data connectivity if applicable) before then transmitting the resulting fingerprint data to the remote destination.

FIG. 9 is next another flow chart depicting example functions that can be carried out in accordance with an embodiment of the present method. As shown in FIG. 9, at step 88, the method involves providing a wireless communication device (WCD) that has (i) a wireless transceiver for engaging in air interface communication with a serving radio access network, (ii) a fingerprint scanner, (iii) a processor, and (iv) data storage containing program logic. In accordance with the method, the fingerprint scanner of the WCD is operable to scan a fingerprint of a user of the WCD, and the program logic defines a fingerprint scan-report function that is executable by the processor, automatically in response to a fingerprint-scan trigger message received by the WCD via an air interface from the radio access network (a) to cause the fingerprint scanner to scan the fingerprint of the user without providing to the user a notification of the fingerprint scanning and (b) to transmit resulting fingerprint data via the radio access network to a network server without providing to the user a notification of the transmitting.

At step 90, the method then involves transmitting the fingerprint-scan trigger message to the WCD from the radio access network so as to cause the WCD to execute the fingerprint scan-report function and so as to cause the WCD to report the resulting fingerprint data to the network server. Causing the WCD to execute the fingerprint scan-report function represents a physical transformation of the WCD, as the WCD transitions to apply its fingerprint scanner and to then apply its network interface so as to transmit the resulting fingerprint data.

The functions of steps 88 and 90 can be implemented by a wireless service provider or retailer that distributes (e.g., sells) the WCD to a subscriber, or by any other entity (company, person, automated device or system, or the like.)

Exemplary embodiments have been described above. Those of ordinary skill in the art will appreciate, however, that variations from the disclosed embodiments are possible, while remaining within the scope and spirit of the invention. As an alternative, for instance, the fingerprint scanning and/or reporting that the PCD does in response to receipt of the fingerprint scan-report trigger message could be done with notice to a user of the device. Other alternatives and examples are possible as well.

What is claimed is:

1. A system comprising:
   a portable communication device (PCD) including (i) a network interface for engaging in network communication, (ii) a fingerprint scanner, (iii) a location-determining function for determining a geographic location of the PCD, (iv) a processor, and (v) data storage containing program logic,
   the fingerprint scanner being operable to scan a fingerprint of a user of the PCD, and
   the program logic defining a fingerprint scan-report function that is executable by the processor (i) to receive via the network interface a fingerprint scan-report trigger message provided in response to a report that the PCD has been lost or stolen, (ii) automatically in response to the receiving of the fingerprint scan-report trigger message, to cause the fingerprint scanner to scan the fingerprint of the user, and (iii) to transmit via the network interface to a destination the resulting fingerprint data and the geographic location of the PCD,
   whereby the transmitted fingerprint data is useable as a basis to try to identify the user whose fingerprint was scanned and, in turn, as a basis to potentially recover the PCD that was reported lost or stolen,
   wherein the PCD does not provide to the user a notification of the fingerprint scanning, and the PCD does not provide to the user a notification of the transmitting.

2. The system of claim 1, wherein the PCD further comprises a button, and wherein the fingerprint scanner is integrated with the button so as to scan the fingerprint when the user touches the button.

3. The system of claim 2, wherein the button is selected from the group consisting of a home button, a navigation button, and a power button.

4. The system of claim 3, wherein the button is a home button.

5. The system of claim 1, wherein the receiving of the scan-report trigger message comprises receiving of the scan-report trigger message transmitted from a server, and wherein the destination is also the server.

6. The system of claim 1, wherein the fingerprint scan-report function is executable to invoke the fingerprint scanner, to wait for the fingerprint scanner to scan the fingerprint of the user, and to then wait until the PCD acquires network connectivity before transmitting the resulting fingerprint data to the destination.

7. The system of claim 1, wherein the network interface is a wireless communication interface.

8. The system of claim 1, wherein the network interface is a wired communication interface.

9. The system of claim 1, wherein the PCD further comprises a touch-screen display, and wherein the fingerprint scanner is integrated with the touch-screen display so as to scan the fingerprint when the user touches the touch-screen.

10. The system of claim 1,
wherein the PCD defines a front surface having a user-interface including a display, and the PCD defines a side surface substantially normal to the front surface, and back surface opposing the front surface, and
wherein the fingerprint scanner is integrated with at least one of the back surface and the side service, so as to scan the fingerprint when the user touches the back surface or side surface of the PCD.

11. A method comprising:
receiving into a portable communication device (PCD), via a network interface of the PCD, a fingerprint scan-report trigger message provided in response to a report that PCD has been lost or stolen; and
responsive to receiving the fingerprint scan-report trigger message, the PCD automatically applying logic (i) to invoke a fingerprint scanner in the PCD to scan a fingerprint of a user of the PCD in a manner that does not provide to the user a notification of the fingerprint scanning, and (ii) to transmit resulting fingerprint data, and an indication of geographic location of the PCD, via the network interface to a remote destination in a manner that does not provide to the user a notification of the transmitting,
whereby the transmitted fingerprint data is useable as a basis to try to identify the user whose fingerprint was scanned and, in turn, as a basis to potentially recover the PCD that was reported lost or stolen.

12. The method of claim 11, wherein the fingerprint scan-report trigger message specifies an address of the remote destination,
the method further comprising the PCD reading the address from the received fingerprint scan-report trigger message, so as to then transmit the resulting fingerprint data to the address.

13. The method of claim 11, further comprising:
after scanning the fingerprint of the user, the PCD waiting to acquire network connectivity before transmitting the resulting fingerprint data to the remote destination.

14. The method of claim 11, wherein the PCD comprises a button, and wherein the fingerprint scanner is integrated with the button so as to scan the fingerprint when the user touches the button.

15. The method of claim 14, wherein the button is selected from the group consisting of a home button, a navigation button, and a power button.

16. The method of claim 15, wherein the button is a home button.

\* \* \* \* \*